US011483361B2

(12) United States Patent
Scott et al.

(10) Patent No.: US 11,483,361 B2
(45) Date of Patent: Oct. 25, 2022

(54) AUDIO STEM ACCESS AND DELIVERY SOLUTION

(71) Applicant: KORD, Inc., Port Washington, NY (US)

(72) Inventors: Jaime Scott, Port Washington, NY (US); Avigdor Susana, Forest Hills, NY (US); Frank Mendez, Wood-Ridge, NJ (US)

(73) Assignee: KORD, INC., Port Washington, NY (US)

( * ) Notice: Subject to any disclaimer, the term of this patent is extended or adjusted under 35 U.S.C. 154(b) by 0 days.

(21) Appl. No.: 17/357,670

(22) Filed: Jun. 24, 2021

(65) Prior Publication Data

US 2021/0409466 A1   Dec. 30, 2021

Related U.S. Application Data

(60) Provisional application No. 63/043,359, filed on Jun. 24, 2020.

(51) Int. Cl.
*H04L 29/06* (2006.01)
*H04L 65/61* (2022.01)
*G06F 3/16* (2006.01)
*H04L 67/02* (2022.01)

(52) U.S. Cl.
CPC ............. *H04L 65/61* (2022.05); *G06F 3/165* (2013.01); *H04L 67/02* (2013.01)

(58) Field of Classification Search
CPC ... H04L 65/4069; H04L 67/02; G06F 3/1654; G10H 2210/131
See application file for complete search history.

(56) References Cited

U.S. PATENT DOCUMENTS

| | | | |
|---|---|---|---|
| 8,207,438 B2 | 6/2012 | Humphrey |
| 8,278,543 B2 | 10/2012 | Humphrey |
| 8,278,544 B2 | 10/2012 | Humphrey |
| 8,283,545 B2 | 10/2012 | Humphrey |
| 8,319,084 B2 | 11/2012 | Humphrey |
| 8,367,923 B2 | 2/2013 | Humphrey |
| 8,476,517 B2 | 7/2013 | Humphrey |
| 8,847,053 B2 | 9/2014 | Humphrey et al. |
| 9,311,824 B2 | 4/2016 | Humphrey |
| 9,398,390 B2 | 7/2016 | Siciliano |
| 9,626,877 B2 | 4/2017 | Humphrey |
| 9,761,151 B2 | 9/2017 | Humphrey et al. |
| 9,857,934 B2 | 1/2018 | Humphrey et al. |

(Continued)

*Primary Examiner* — Chirag R Patel
(74) *Attorney, Agent, or Firm* — Snell & Wilmer, L.L.P.

(57) ABSTRACT

A system and method for streaming delivery of audio Stems along with Metadata, and related music content. System includes user-interaction with a Playback Device to interact with streamed Stems. The system may also include on-demand streaming delivery of Stems. This platform can be used by any service or application wishing to stream Stems to end-users, for example, DSPs (i.e., streaming music platforms), radio stations, music/audio/audio-visual applications, software developers, et al (a Requesting Entity). Storage, encoding, and processing of Stems may be completed via server-side solution which enables on-demand delivery of Stems, in any combination, in response to instructions from the client-side Requesting Entity.

20 Claims, 11 Drawing Sheets

(56) References Cited

U.S. PATENT DOCUMENTS

| | | |
|---|---|---|
| 9,959,779 B2 | 5/2018 | Humphrey et al. |
| 10,170,017 B2 | 1/2019 | Humphrey et al. |
| 10,192,460 B2 | 1/2019 | Humphrey |
| 10,679,515 B2 | 6/2020 | Humphrey |
| 10,789,924 B2 | 9/2020 | Humphrey et al. |
| 11,004,435 B2 | 5/2021 | Humphrey et al. |
| 11,055,058 B2 * | 7/2021 | Triplett .................. G05B 15/02 |
| 2002/0186842 A1 * | 12/2002 | Sabet-Sharghi ............................. G11B 20/00086 |
| 2010/0095829 A1 * | 4/2010 | Edwards ................ G10H 1/365 84/625 |
| 2012/0151344 A1 | 6/2012 | Humphrey et al. |
| 2014/0012898 A1 * | 1/2014 | Mittal ................... G06F 16/957 709/203 |
| 2014/0150628 A1 | 6/2014 | Humphrey |
| 2015/0025663 A1 * | 1/2015 | Cameron ......... H04N 21/43072 700/94 |
| 2015/0350134 A1 * | 12/2015 | Yang ................... H04L 67/1095 709/206 |
| 2016/0315722 A1 | 10/2016 | Holman |
| 2017/0124601 A1 * | 5/2017 | Donabedian ........... G06Q 50/01 |
| 2018/0300162 A1 * | 10/2018 | Kotlicki ................. G06F 9/453 |
| 2019/0073418 A1 * | 3/2019 | van der Heide ...... G06F 16/637 |
| 2019/0372899 A1 * | 12/2019 | Zhou ....................... H04L 47/74 |
| 2021/0090590 A1 | 3/2021 | Vicente et al. |

\* cited by examiner

AUDIO STEM ACCESS AND DELIVERY SOLUTION

CROSS-REFERENCE TO RELATED APPLICATIONS

The application claims priority to and the benefit of U.S. Provisional Ser. No. 63/043,359 filed Jun. 24, 2020 and entitled "Streaming Stems," which is incorporated herein in its entirety for all purposes.

FIELD

The disclosure generally relates to music entertainment and instruction, and more particularly, to the streaming of stems to a user such that the user may interact with the stems using a playback device.

BACKGROUND

Most songs we hear were recorded using multitrack technology. More specifically, each instrument was recorded to a separate, individual "track" of a tape, or in the case of digital recordings, each instrument was recorded on a separate software track. Once all the tracks are recorded, the tracks are generally combined, or "mixed" together to a 2-channel (e.g., left and right) format for music known as "stereo". In addition to these stereo mixes, music may also be mixed to one or more multiple-channel audio formats. In the case of audio-visual recordings (movies, videos, TV, etc.), tracks may be mixed down to 3 or more channels. For example, standard surround sound is a 6-channel format.

Any number of discrete tracks created during the recording process may be combined into a sub-mix to form a "Stem." For example, a Vocal Stem could include 3 tracks: 1 lead vocal track, and 2 background vocal tracks. Another example would be a Drum Stem comprised of 6 tracks of kick drum, snare drum, hi-hat, floor tom, and 2 overhead microphones. One common use of Stems is that a music recording's instrumental orchestration can be altered and/or combined with new elements or new tracks, to form new and different versions of a song. This is commonly referred to as a Remix.

Film and television productions also use Stems. Multiple tracks can be mixed to create 1 channel of Dialog, 1 channel of Music, and 1 channel of Effects ("DME"). This allows for flexibility in the creation of a final mix, wherein the levels and processing of each can be adjusted as needed.

A mixing device typically obtains recorded audio/video stems and/or tracks from one or more types of recorded media. The recorded media may include, for example, analog tape (generally multi track), digital audio files from a hard drive, digital audio files from a removable disc (CD, DVD, etc.), digital audio files from removable media (flash drives, etc.), digital file sharing via network, and/or the internet. Thus, these files had been recorded in the past, and before a user can interact with the tracks (e.g., playback, mute, solo, mix, export, etc), the files must be physically brought into the mixing platform, and/or routed through a physical mixer.

The need for a system of sharing and delivery of Stems will increase as the music industry continues to move towards Stem-based works. Many commercial ventures have arisen recently that could benefit from this technology. As these companies, and the respective music rightsholders (e.g., artists, songwriters, publishers, music labels, production companies) further monetize these "pieces" of a recording, the need for a "clearinghouse" will facilitate the process as well as address inefficiencies and security concerns.

SUMMARY

The system accesses stems from a remote server and streams the stems to a user. The user may listen to and interact with the stems using a playback device. The stems may be accessible on demand and the stems may be streamed in real time.

The system may provide corresponding metadata with each stem to the user. The system may provide metadata associated with the stems to a playback device. The metadata may include at least one of multiple streams of audio Stems, mapping for audio Stems, song lyrics, song musical notation, song related videos, images and graphics, song information, musician information, personnel information, song description information, song statistics, recording information, or rights information.

The system may include receiving an HTTPS request from a playback device. The request may include at least one of user ID, title ID, device information, operating system details, device serial number, manufacturer, model, IP address, geo location, UUID, software version, or user authentication request. The system may provide URLs that correspond to different stem streams, wherein the stem streams are based on the user ID and title ID. The system may provide URLs to the user ID, wherein each URL at least one of is unique to the user ID, contains a TTL (time to live) or a setting to expire after use. The system may create additional stems that include recordings created by the user alongside the stems. The system may communicate with an external hardware device that utilizes software controls of a playback device. The system may load the stems into a memory of a playback device, wherein a playback device begins playback at a synchronized starting point. The system may load two sets of stems into memory simultaneously to implement a buffering solution. The system may receive user input to control the stem that triggers an API call to a playback engine. The system may provide a song progress representation. The system may receive an instruction for at least one of removing, isolating, mute or solo an instrument. The system may also measure a decibel level of the stem.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

Figure 1:
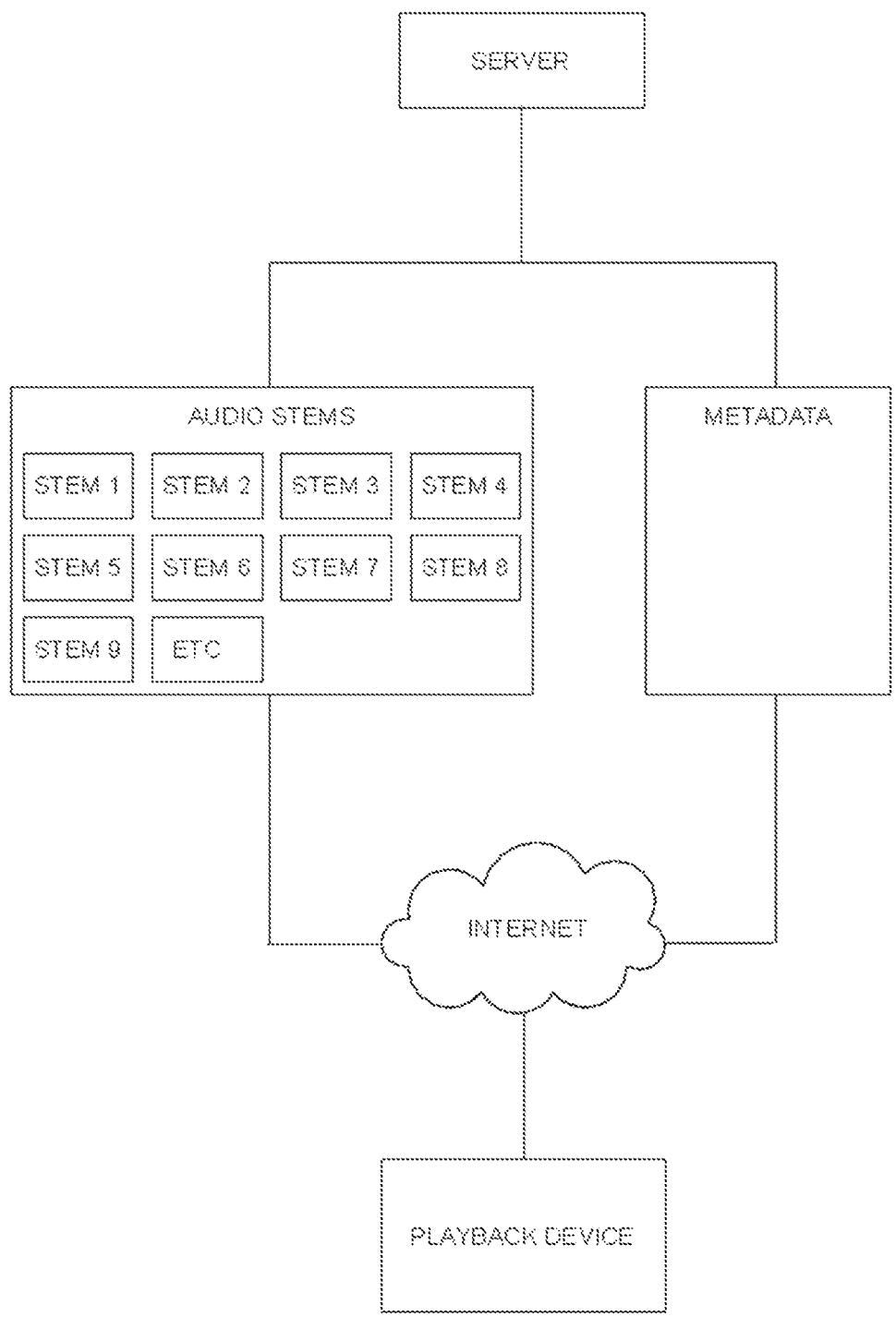
FIG. 1 shows an exemplary system with a server streaming the stems and metadata to a playback device, in accordance with various embodiments.

This disclosure includes a music entertainment and instruction system. In various embodiments, the system may include a server that streams one or more audio Stems, Metadata, videos and/or other content to a Playback Device, as set forth in FIG. 1. This streaming content may also include, for example, lyrics, chords, musical notation, musical tablature, images, song information, instrument information, recording engineer information, and/or artist information ("metadata"). Delivery to the Playback Device via streaming allows for server-side control of copyrighted material, including the ability for the server to update or change contents, if needed or desired. The use of a server streaming the content avoids the client-side needing to download the Stems to a Playback Device. In addition, the use of a server to handle the streaming puts many of the resources on the server-side, so such an arrangement reduces the need for resources on the client-side device resulting in an efficiency of resources on the client-side device.

Figure 4:
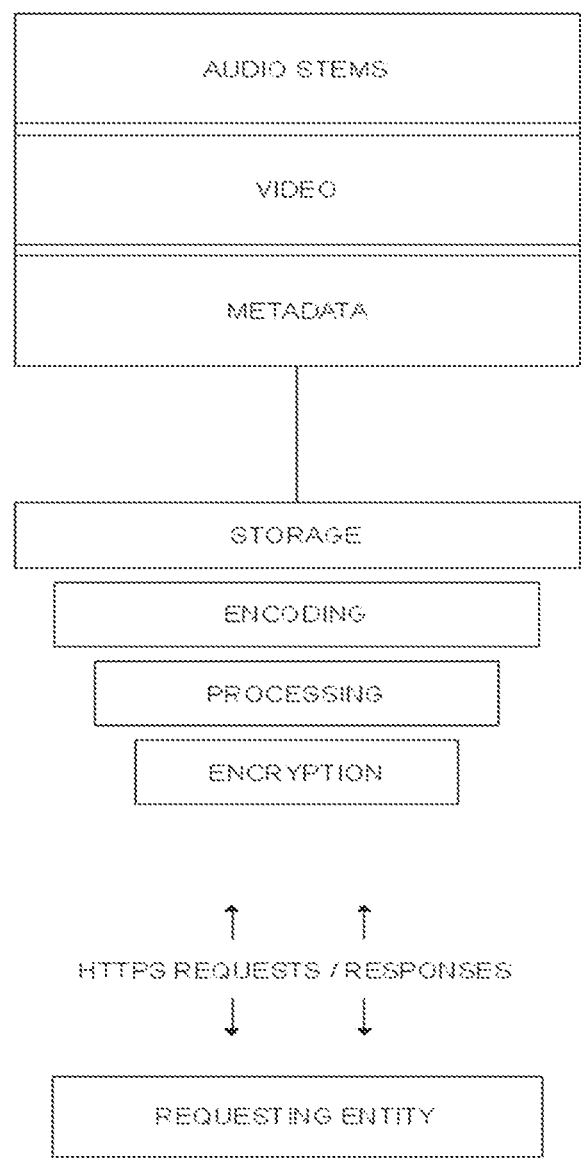
FIG. 4 shows an exemplary delivery process that includes a server response with metadata instructions for the playback device, in accordance with various embodiments.

More specifically, the Playback Device may be part of, for example, a personal computer, iOS device, Android device, smart TV, TV connected streaming device, smart radio, AppleTV, Apple HomePod devices, devices with Apple's voice assistant (Siri), Google Nest devices, Google Nest Audio devices, devices with Google's voice assistant, Amazon Fire devices, Amazon Echo devices, devices with Amazon's voice assistant (Alexa), Roku devices, etc. The Playback Device may send an HTTPS request to an administrative server. In various embodiments, the request may include details about the user/requester such as, for example, user id, device information, operating system details, device serial number, manufacturer, model, IP address, geo location, UUID, software version, and/or user authentication request. Based on the User and Title ID sent in the request, the server may respond with data relating to the Title ID requested, including an array of dynamic, unique, and/or encoded URL's that correspond to different stem streams. Each URL is unique to the user/requester and may also contain a TTL (time to live) and is set to expire after use. For additional security, in various embodiments, the Playback Device and the User cannot access or use the URL in any other method or time. The URL may not be traced to reveal the path where the secure content is stored. When media is initially requested, in various embodiments, the associated metadata corresponding to that media is delivered to the playback device. The playback device may display the metadata and make it available for access. As set forth in FIG. 4, the server response may contain Metadata instructions which may include one or more of multiple streams of audio Stems, mapping for audio Stems, song lyrics, song musical notation (chord names, chord shapes, standard notation, tablature), song related videos, images and graphics, song information (release date, album, songwriter(s), record label, music publisher(s), etc.), musician information, personnel information, song description information, song statistics, recording information (instruments, equipment, recording studio, etc.), rights information, etc. In various embodiments, stem mapping tells a playback device how and where each stem should be used. For example, one Stem may be designated as the vocal stem for a particular song, one may be the keyboard 1 Stem, and a third Stem might be designated as a bass guitar Stem. The playback device can then match each Stem with its corresponding association in the playback device interface.

Metadata is housed in a database on the server. The metadata may have been manually entered, or automatically ingested via secure web service post. Manual entry is achieved via secure web interface. Automated entry is achieved via web-service posts in a format such as XML. In various embodiments, self-created metadata and/or metadata delivered from a third party may be utilized. An example of a third party would be a record label who may own the sound recording and/or intellectual property for a sound recording. Record labels provide metadata matching different music. However, some of the metadata may be unique to a system host, i.e., original written content relating to a piece of music, descriptions, etc.

Figure 10:
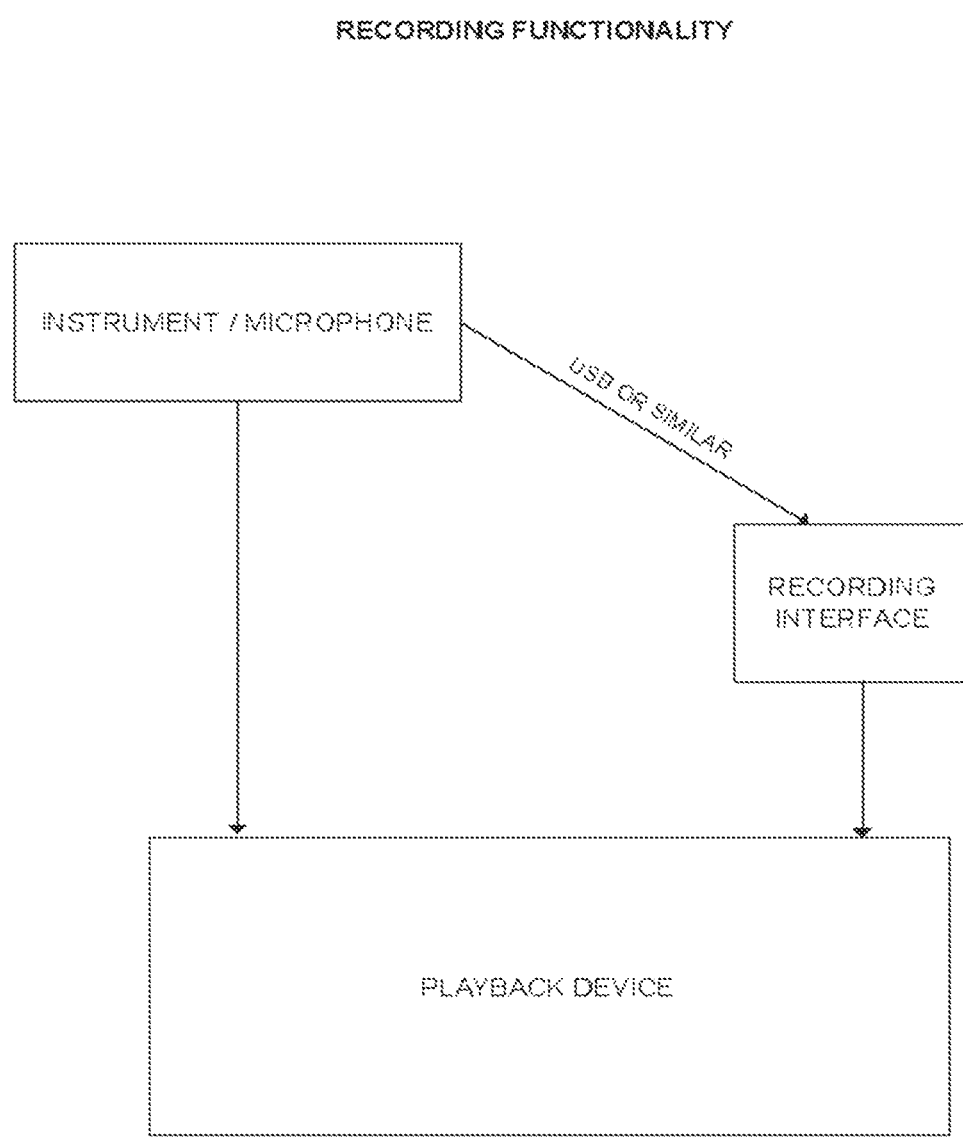
FIG. 10 shows the recording functionality, wherein a user can record his own tracks for use within the system and/or Playback Device, in accordance with various embodiments.

In various embodiments, the system may incorporate recording functionality, wherein a user can record their own performance via a musical instrument, microphone, and/or other audio device, to create additional Stem(s) to be played back alongside existing Stems within a song or work. As shown in FIG. 10, in various embodiments, direct recording may be achieved utilizing the existing capabilities of a Playback Device, and/or by utilizing a separate, external recording device designed for audio recording capture with mobile phones, computers, tablets, etc.

Figure 11:
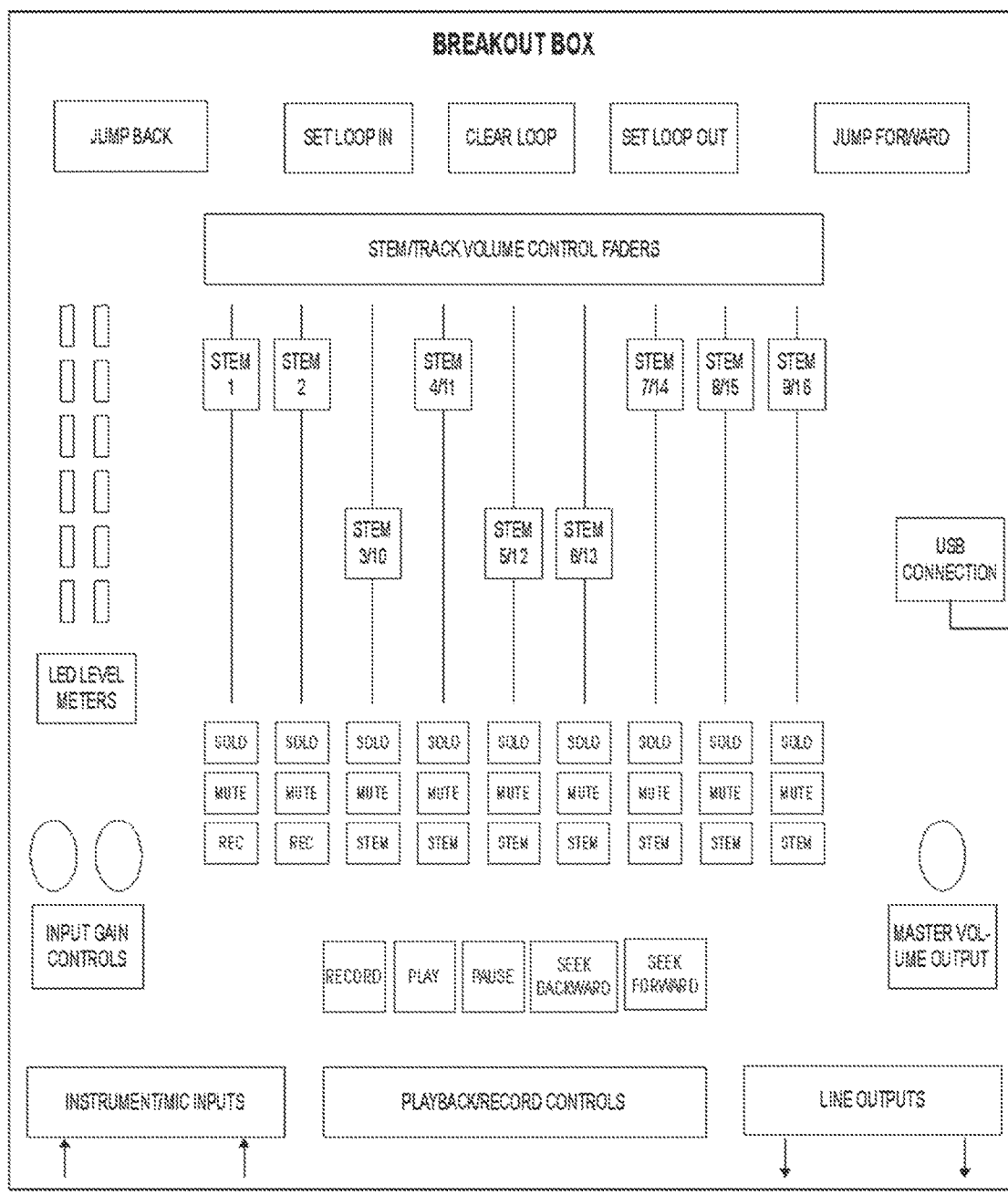
FIG. 11 shows a "Breakout Box," wherein a user can manipulate, control, and/or interact with the software stems on a Playback Device via an external hardware device, in accordance with various embodiments.

In various embodiments, the system may incorporate an external hardware device for manipulating and interacting with Stems. This external hardware device may allow a user to utilize the software controls on the Playback Device, via hardware controls on the external device. This device would be specifically designed to work with a Stem streaming Playback Device as described herein. The device would also include the ability to connect external instruments, microphones, and/or recording devices to enable recording new tracks for use in the software. As shown in FIG. 11, in various embodiments, this "breakout box" may include controls and functionality such as, for example, faders to control discrete stem/track volume; mute and/or solo buttons; looping functionality; jump back and/or jump forward controls; LED level meters; input gain control(s); Instrument/microphone input connections; line outputs for connections to amplifiers, tuners, P.A. systems, etc.; master volume output level control; playback control functions (e.g., play, pause, seek forward, seek backward, record); and/or USB connection or similar to interface with Playback Device.

In various embodiments, the Player Engine receives and/or processes metadata for use on the client Playback Device, via SSL (secure socket layer). To process the metadata, the player parses instructions delivered via data file (e.g. XML). For example, song title, artist, album, album art, songwriter(s), release date, lyrics, chords, publisher, label and/or the like.

Figure 5:
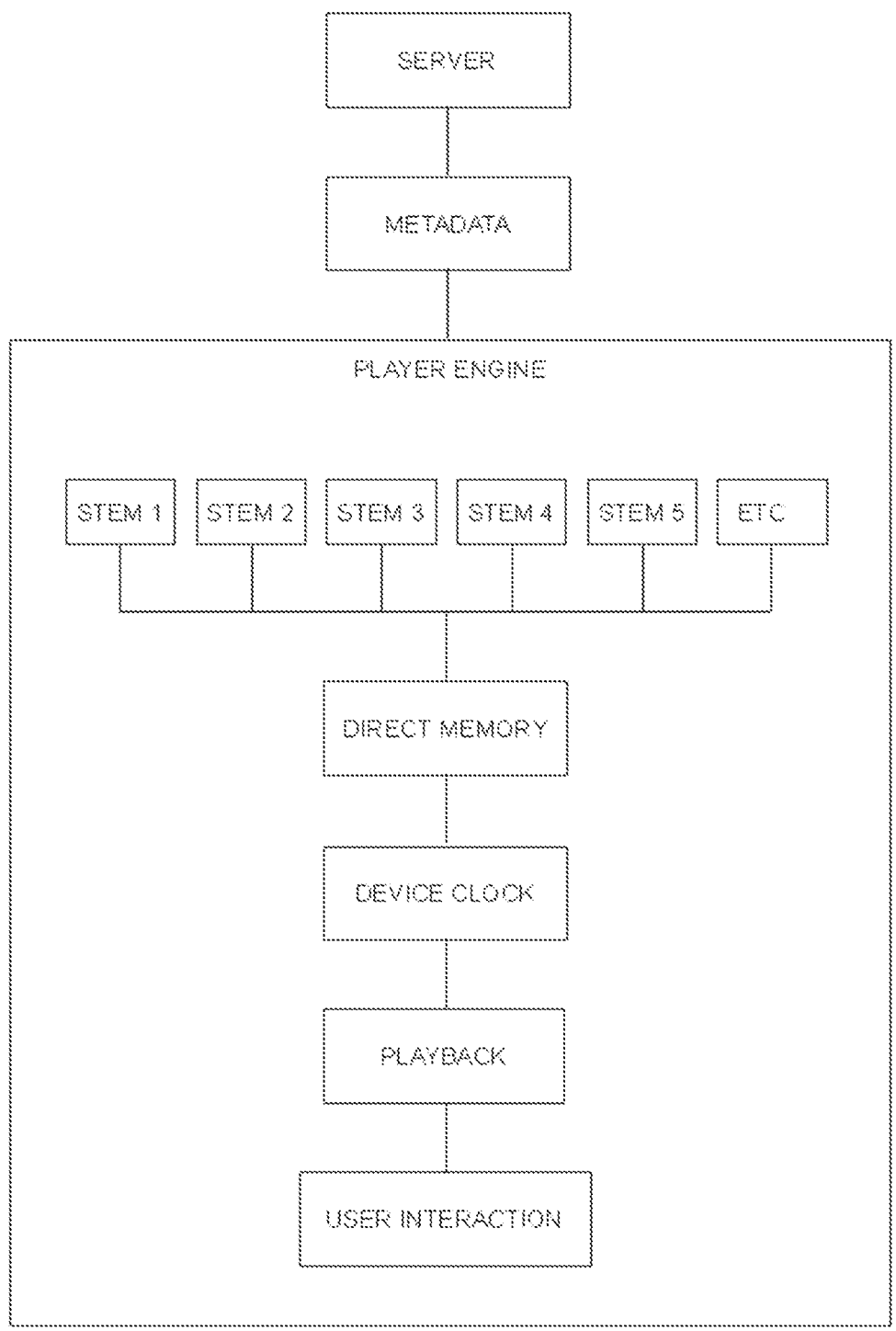
FIG. 5 shows an exemplary player engine of the playback device for decoding and processing the metadata for use on the playback device, in accordance with various embodiments.

These Stems are loaded into the memory of the Playback Device such that the Playback Device may begin playback at a synchronized starting point, as set forth in FIG. 5. In various embodiments, the Player Engine synchronizes multiple audio Stems for playback utilizing the playback device system clock. The server(s) may send multiple streams to the playback device. Depending on the device capabilities, a custom solution may be implemented to ensure synchronized playback of multiple stems within a song. The playback device may buffer a portion of the song (or the whole song) into multiple threads. Each thread acts as an individual player for each streamed stem, as well as a data regulator. When a minimum viable buffer has been achieved across all threads, each thread will cache the data received and the playback system may instruct the operating system to begin to play the song at a selected system time in the future. This ensures synchronized playback. If a user or the playback device chooses to pause playback, the system goes over all threads sequentially and pauses the playback. Streaming will be stopped at the next buffer satisfaction. A similar process is utilized for both play and pause. Actions such as seek reverse and seek forward act in a similar manner, wherein the system goes over all the threads sequentially and activates the designated command (e.g., seek, forward, seek reverse) on each thread.

Figure 6:
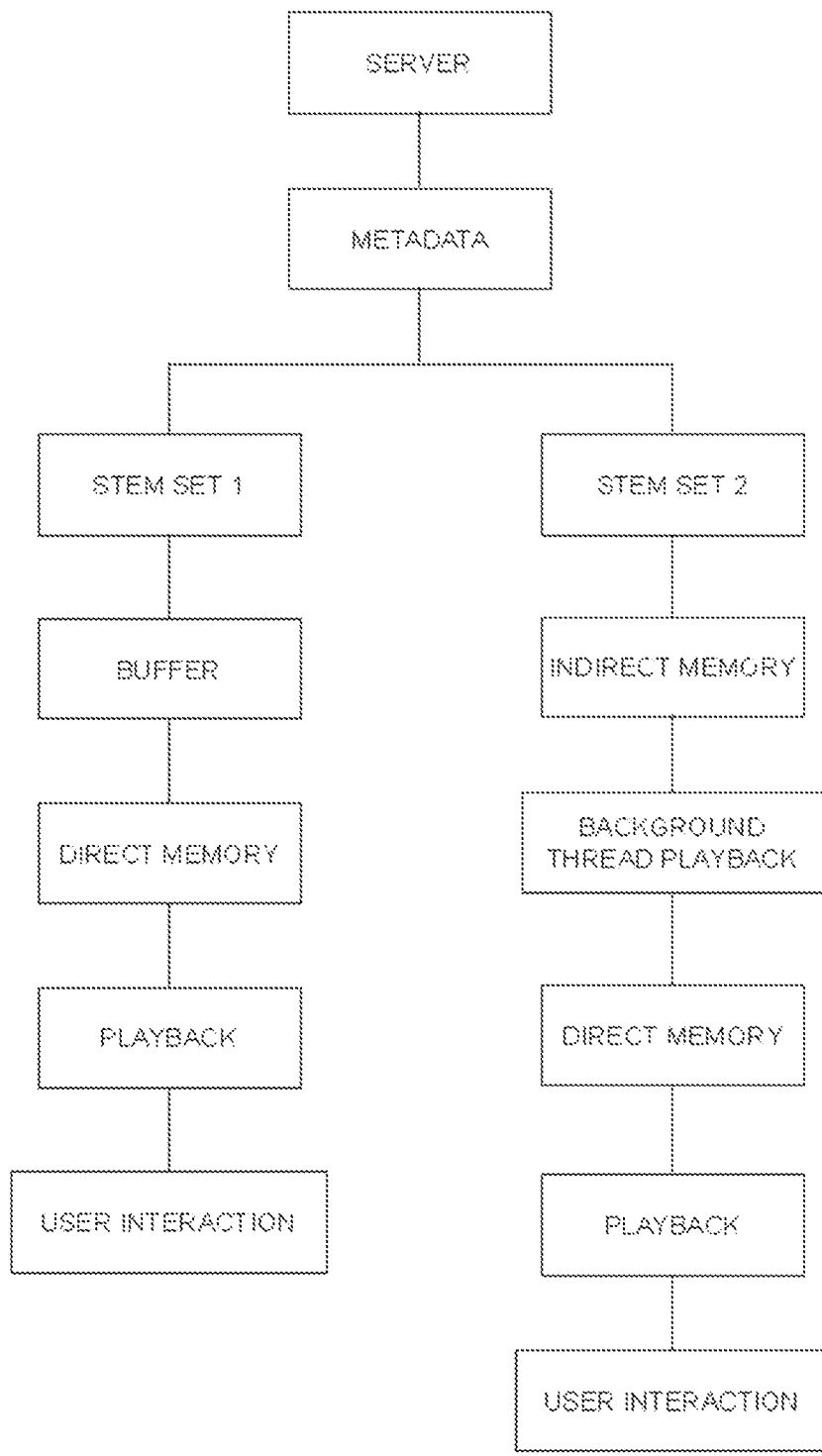
FIG. 6 shows an exemplary auxiliary player engine with a buffering solution, in accordance with various embodiments.

In various embodiments, certain devices limit access to certain system resources such as device system clock and direct access to memory, so an alternative playback solution has been devised. These may include web browsers and/or systems that utilize web browser technology to render applications. Currently, most modern web browsers include two types of audio processing objects: HTML5 web player and Web Audio API. As set forth in FIG. 6, the system may incorporate a buffering solution, wherein two sets of Stems are loaded into memory simultaneously. The first set (Stem Set 1) is loaded into a continuous buffer to begin playback. Specifically, each stem in the set is buffered into its own web player. The system then instructs the multiple players to begin playback at the same time once all players have attained a minimum viable amount of buffering. Concurrently, an identical set of stems (Stem Set 2) is loaded to indirect-memory (e.g., blob or disk) in its entirety. The system then begins playback of Stem Set 2 on different web player threads in the background, at the highest playback speed available, at zero-volume. Once the players housing Stem Set 2 begin playback, this moves the stems from indirect-memory to direct-memory where they can now be controlled by the user. If the user interacts with the playback of the song by seeking forward or backward, the Player Engine switches over to Stem Set 2 for playback from direct-memory, as only stems in direct memory can be controlled by a user.

Figure 2:
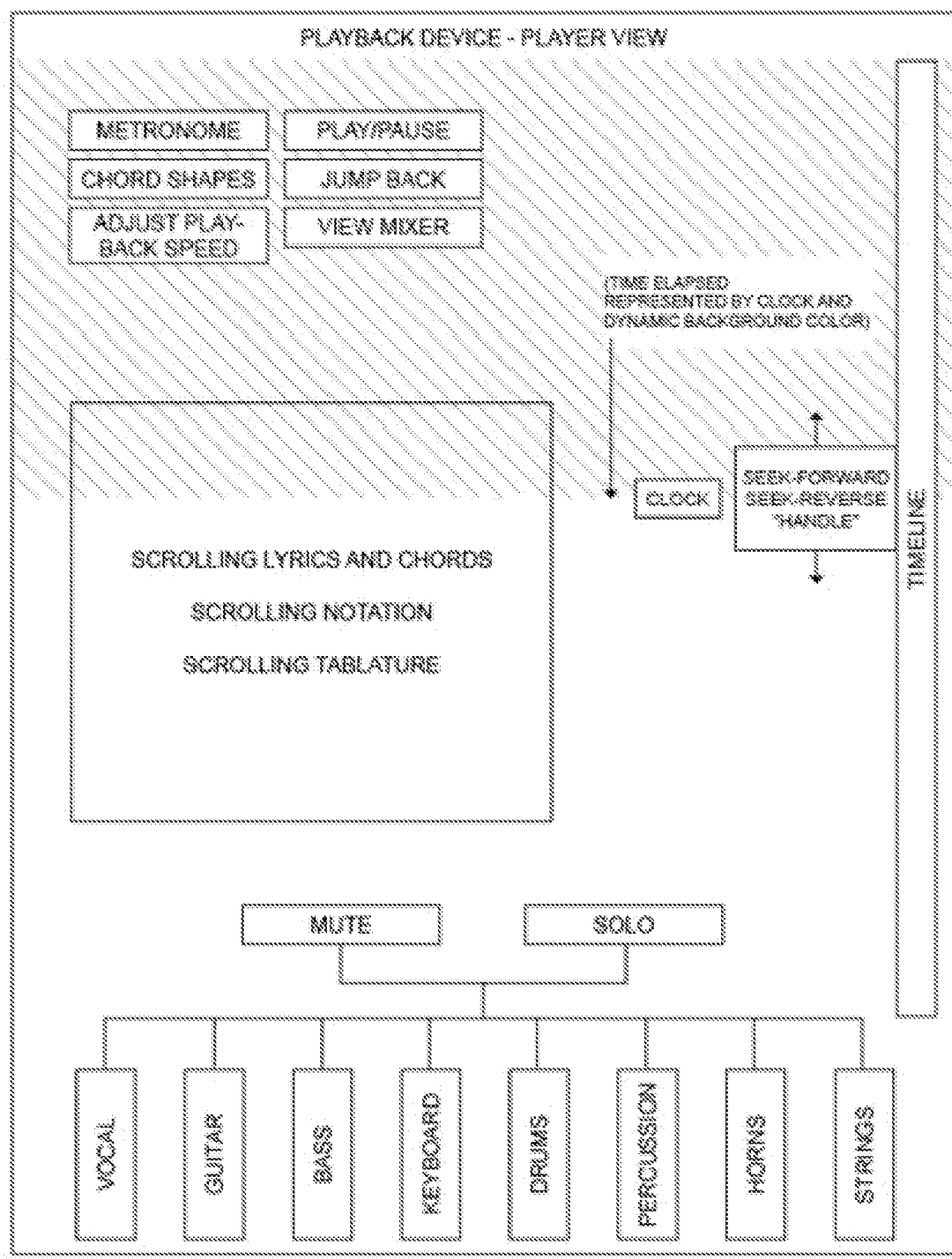
FIG. 2 shows an exemplary user interface on the playback device that allows a user to select (e.g., tap, touch, click, etc.) icons representing instruments in a song to mute or solo such instruments, in accordance with various embodiments.
Figure 3:
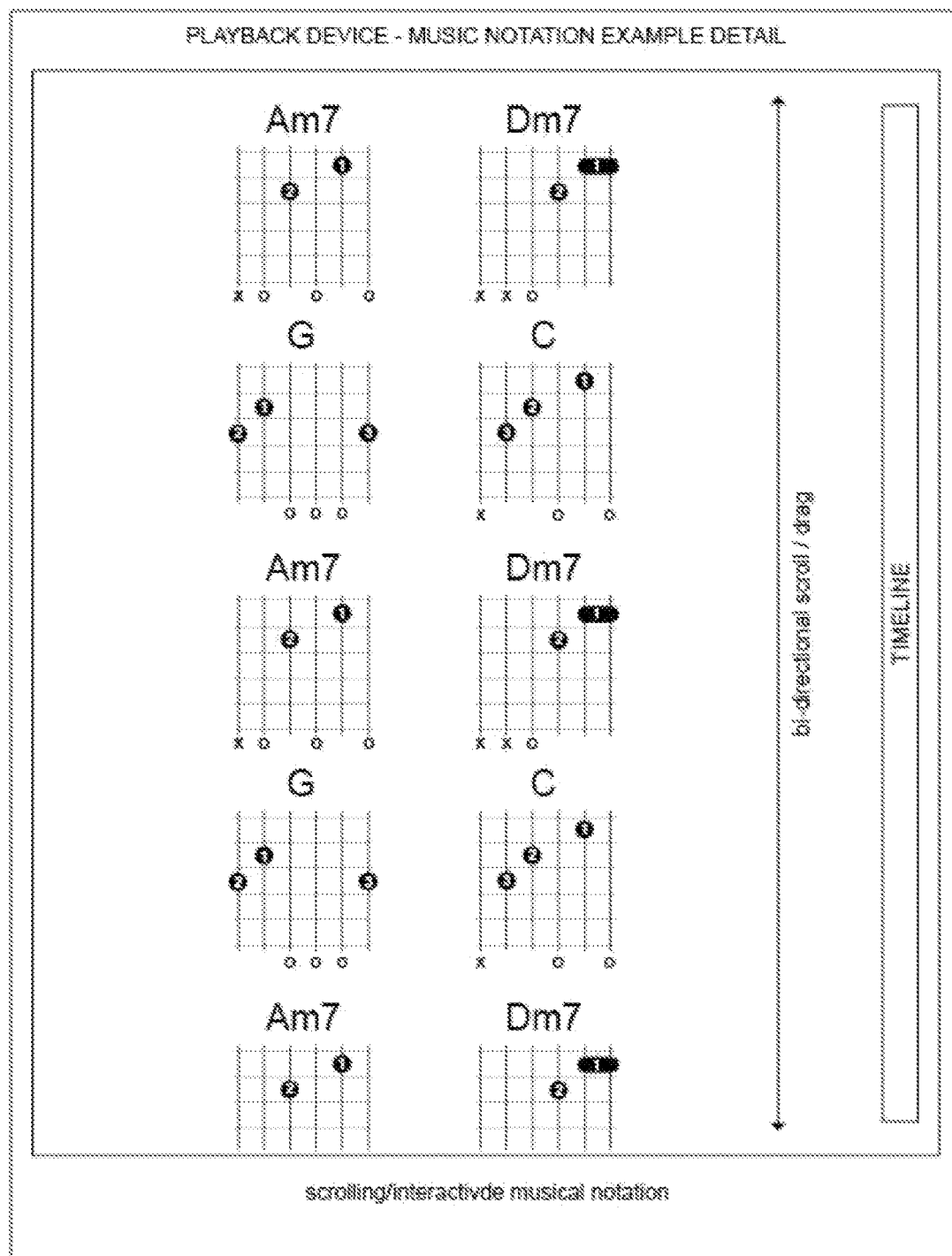
FIG. 3 shows detail of an exemplary user interface on the playback device that allows a user to view chord representations and/or similar musical notation related to the corresponding local playback or streaming playback of a specific musical recording, in accordance with various embodiments. This notation may include standard musical notation, "tablature", or graphical representations of chord shapes and chord fingerings.

In various embodiments, the user may control which Stems the user wants to hear via a user interface (UI) on the user's Playback Device. The UI allows the user to select icons representing the instruments in a song such that the icon may cause the Playback Device to, for example, partially or fully mute, alter or solo the instruments, as set forth in FIG. 2. The Playback Engine UI allows a user to interact with and control the playback of a set of stems (a song). An API layer may connect the UI with the Playback Engine, so that each input selected by a user triggers a specific API call to the Playback Engine. These commands enable users to complete one or more of the following exemplary functions during song playback:

Play or pause, one or more synchronized audio Stems. A user taps, clicks or selects a button or a visual icon representing the play/pause command during playback. This action triggers an API call to start or stop a defined set of stems.

Seek-forward or seek-backward during playback of one or more synchronized audio Stems. A user taps, clicks or selects a button or a visual icon representing the seek forward or seek backward command during playback. This action triggers an API call to choose a user-defined start time to begin playback. This UI command may also be visualized by a button that a user can slide to choose a start time to begin playback. The slider may be dragged vertically or horizontally to go to a specific part of a song.

Combine, mute, or isolate one or more synchronized audio Stems. A user taps, clicks or selects a button or a visual icon representing a particular stem or musical instrument during playback. This action triggers an API call to enable or disable the audio playback of that particular stem.

Slow down or speed up one or more synchronized audio Stems. A user taps, clicks or selects a button or a visual icon representing the adjust playback speed command during playback. This action triggers an API call to reduce or increase the playback speed of a defined set of stems.

Volume adjustment of one or more synchronized audio Stems. A user taps, clicks or selects a button or a visual icon representing the volume command during playback. This action triggers an API call to increase or decrease the playback volume a defined set of stems.

Turn on or turn off a metronome/"Click Track" stem. A user taps, clicks or selects a button or a visual icon representing the metronome function a.k.a. the "click-track" of a song during playback. This action triggers an API call to enable or disable the audio playback of the click-track stem/track.

View lyrics, chords, and/or chord shapes. A user taps, clicks or selects a button or a visual icon to show/hide and/or toggle between song lyrics and visual representation of chords on an instrument. For example, these chord visualizations may show specific fingerings for an instrument such as guitar, ukulele, piano, etc. This action triggers an API call to show or hide lyrics or chord visualizations during playback.

Show/hide tablature or standard musical notation. A user taps, clicks or selects a button or a visual icon to show or hide musical tablature or standard musical notation. This action triggers an API call to show or hide tablature or musical notation during playback.

Move lyrics via touch to access different sections of the song. A user taps, clicks or drags a button or a visual icon representing song lyrics during playback. Selecting a group of lyrics tells the player to play the song from the point in time when those lyrics appear in the song. Additionally, the lyrics can be scrolled by user input to any section of a song in seek-forward or seek-backward and begin playback from a user-defined time. These actions trigger an API call to choose a user-defined start time to begin playback.

Move chords, chord shapes, musical notation, and/or musical tablature via touch to access different sections of the song. A user may tap, click or drag a button or a visual icon representing chords, chord shapes, musical notation, and/or musical tablature during playback. Selecting a group of chords and/or notation tells the player to play the song from the point in time when those lyrics appear in the song. Additionally, the chords and/or notation can be scrolled by user input to any section of a song in seek-forward or seek-backward and begin playback from a user-defined time. These actions trigger an API call to choose a user-defined start time to begin playback.

Show/hide song information/metadata (description, history, etc.) A user taps, clicks or selects a button or a visual icon to display visual or textual content during playback. This action triggers an API call to display various content related to the active song.

Show/hide closed captioning (CC). A user taps, clicks or selects a button or a visual icon representing closed captioning (CC) if available. This would be applicable while playing a video. This action triggers an API call to display the closed caption text related to the active video.

For example, imagine listening to the song "Hotel California" in the app. If you are a guitarist, you could remove, or "mute" the guitar from the song, then play along with the song yourself. You'd be contributing your own guitar to the remaining original tracks. The system provides similar functionality for other instruments such as bass, keyboards, drums, or vocals. The system is like karaoke, but for ALL the instruments. You could even mute multiple instruments and play along with your friends. Conversely, you could also isolate, or "solo" an instrument to hear it clearly. This is perfect for musicians who may want to learn a guitar solo, or a bassline, or a vocal harmony. The system allows a user to slow down passages to make them easier to hear and learn.

The system may include one or more of the following features, in accordance with various embodiments. The system may offer the ability for users to access streaming audio tracks made available to users as part of an interactive music instruction platform which will utilize the underlying stems of master recordings in order to facilitate deep music learning and discovery. The system may offer sound recordings selected and curated by the musicologists, and may enable a host of interactive features for end users including the ability to isolate individual instruments and vocals, decrease the speed of a track or loop a section of the recording, as well as provide scrolling lyrics, chord progression and tablature, and allow users to include a metronome to guide their instruction. The system may also offer additional features such as user profile, playlisting, and instructional chat. The system may include a search component that may allow users to search by tracks recently added, artist, song title, genre or album. In addition to being an instructional application, the system provides deep dives by end users into songs—not only by discovering and listening to tracks but also engaging with metadata including articles, liner/session notes, artist and studio images, artist/producer/engineer interviews, analytical videos, instructional videos, fan content, etc. A mixture of DVD commentary, classic albums documentary, fan club content, and interactive listening all rolled into one.

In various embodiments, the system includes a streaming music app wherein users listen to songs, then remove or isolate the different instruments they hear. Interactive lyrics and chords scroll along in real time, providing a unique and compelling music instructional platform. Users can also watch original video content associated with each song, or an album, or an artist. The system may also be a platform for musicians to share their performances with other members of the community. The user may be streaming while playing along with stems. The system includes a streaming platform where musicians can stream their channel playing along with stems, tracks, loops, beats etc. The user could utilize an interface to add and remove instruments on the fly.

The system may include a song progress representation. While a song plays, the visual background of the player fills up with color from the top moving towards the bottom creating a unique visualization of time elapsed, and time remaining in the song. The player calculates time remaining from both metadata and the length of each stem in memory.

The system may include a button or a visual icon representing the seek forward or seek backward command during playback. The interface may also include a drag-able "seek" slider wherein a user can "grab and drag" a "handle" up and down, or left and right, to seek different sections of a song and to jump to a specific section of a song (verse, chorus, guitar solo, etc.). In various embodiments, this action triggers an API call to choose a user-defined start time to begin playback. This UI command may also be visualized by a button that a user can slide to choose a start time to begin playback. The slider may be dragged vertically or horizontally to go to a specific part of a song.

The system may include an Instrument/Stem/Track control. The user may be able to select (e.g., short tap) an instrument icon to mute and/or solo, and select (e.g., long press) an instrument icon to mute and/or solo. A user taps, clicks or selects a button or a visual icon representing a particular stem or musical instrument during playback. To "solo", a track triggers an API call to disable the audio playback of every other stem except the stem being soloed. If a user taps, clicks, selects and then holds that selection, a sub-menu may be accessed which allows a stem to be muted or soloed, or to adjust the volume control for that Stem(s). Haptic Feedback, e.g. a physical vibration, may be utilized as an additional indicator that the state of a Stem has been changed or adjusted.

The system may include music notation, chords, and lyric integration. Code may enable moving chords and other music notation to be perfectly and accurately aligned visually with corresponding moving lyrics. Certain metadata including lyrics and chords may have timestamps interspersed throughout the length of a song. These timestamps may be manually entered and correspond with certain sections of a song to enable the corresponding lyrics to show at the correct moment in a song. In various embodiments, to render the lyrics and chords, and the chord shapes, on a playback device which are time-synchronized with the music recording, the following exemplary system and method may be implemented: Lyrics and chords are stored in a table on a server database with a unique serialized ID. This ID is matched to a related Title ID (e.g. a song). Chord shapes are also stored in a database and the Chord ID is matched to its corresponding Title ID. These chords are added to the database via web administration interface by an administrative user with credentialed access. The administrative interface contains empty text fields for lyrics and chord database input, and blank chord templates for chord shape input. The administrative user manually enters each line of lyrics for a specific song. To map the chord and lyric timing, the administrative user can play the song within the web interface using a standard web audio player. As the song progresses, the user presses a button next to each line of lyrics at the corresponding time that line of lyrics and/or chords appear in the song. Each of these actions records a time-stamp to the system memory and is further inserted to the database upon pressing the save button on the page. When an end-user plays the song on a playback device, the lyrics and chords are rendered simultaneously with the song's audio, and the lyrics and chords appear to match the timing of the song perfectly.

A similar web administration page is utilized to input chord shapes to a database. To accomplish this an administrative user enters data variables on a visual representation of a guitar fingerboard for guitar and bass guitar, and the relevant layout for other musical instruments. This interface allows the user to create a new chord record in the database, and to name the chord (e.g. "Dmaj7"), then select a location (e.g. fret and string number for guitar), and finger number, (e.g. 1-5). Each chord in the database can have multiple variations (e.g. "fingerings"). Upon playback of a song on a playback device, the user can press a button to toggle chord shapes on or off. This triggers an API call to show the rendered chord shaped that correspond to, and match the timing of, the aforementioned chords that accompany the lyrics.

The system may include Visual UI for Stems. The user interface in the app Player may allow users to select icons representing the instruments in a song to mute or solo them. Upon song load, in various embodiments, the system analyzes the number and type of instruments (Stems) available in the song, and displays a visual representation for these instruments as clickable icons. If more than one of the same instrument Stems are available, the system may group the instruments together and present them as one expandable instrument with each selectable available instrument represented visually above the icon.

The user can also enable or disable a Stem to play at a lower volume instead of being completely muted. In various embodiments, if a user clicks on an instrument icon and continues to hold (long-press), an advanced menu may appear, wherein the user can mute or solo each grouped instrument, and/or adjust the variable volume level of each instrument within a grouped Stem. In addition, users may be able to swipe left or right to view additional instruments that may be available. Stem/instrument icons may glow based on the amplitude/volume of its corresponding instrument. The app may measure the decibel level of each stem as it plays, and the higher the amplitude (louder) that Stem is, the brighter and/or stronger the icon will glow. To achieve this effect, the system analyzes each Stem and parses it along a 0-100 value set for every second (or part of a second) of the elapsed playback time of that Stem. This amplitude measurement may be represented as the visual effect described above.

The system may include a Name that Tune Game: Gameplay may utilize stems to allow users to play a "name that tune" style quiz game. Users may play remotely against other users online. For example, the winner would be the first to answer correctly which song is playing just by hearing a particular instrument in a particular section of a song.

The system may include one or more player engines, in accordance with various embodiments. For example, the system may include an iOS Player Engine for Apple phones and related mobile devices, an iPadOS Player Engine for Apple iPad devices, an Android Player Engine for mobile devices which use the Google Android operating system, or any number of additional Player Engines specifically designed for use with various proprietary devices and operating systems.

The system also includes back-end administration features and Content Management Solutions, in accordance with various embodiments. For example, the system may convert text formatted lyrics to meta tags. This allows staff to copy the plain text of song lyrics, and paste into the conversion tool which inserts the lyrics into the database, and automatically formats for use in the app. The system may also include a 'Grab the time' interface, which allows staff to play a song in the back-end administrative console, and in real-time make a selection next to each line of lyrics in order to have the lyrics scroll in perfect time visually within the app.

In various embodiments, the system may also include a chord Shape Creation Tool. The system may allow administration to build chord shapes as played on a guitar, bass, ukulele, mandolin, violin, piano, or other instruments. Each new chord that is built is added to a database, and corresponds to a specific part(s) in a song. The chords are visible by end-users and scroll along with lyrics, and/or in lieu of lyrics, in real time during song playback on a Playback Device. This allows the system to provide specific voicing, and/or fingerings of a chord that may be unique to a particular song. Most representations of chord shapes seen on websites and in instructional platforms are standard or basic versions of chords. This tool also allows designation of a "simple" version of a chord which a user could choose depending on skill level.

In various embodiments, the system may also include on-demand streaming delivery of Stems. This platform can be used by any service or application wishing to provide Stem access to end-users, for example, DSPs (i.e.: streaming music platforms), radio stations, music/audio/audio-visual applications, software developers, et al (a Requesting Entity). Storage, encoding, and processing of Stems is completed via server-side solution which enables on-demand delivery of Stems, in any combination, in response to instructions from the client-side Requesting Entity. All or any subset of processing may be completed directly on the server, wherein in various embodiments, Stem Sets will be pre-combined, or pre-mixed, to be streamed to the Playback Device. This method reduces bandwidth bottlenecks inherent when downloading multiple audio files and also reduces the processing requirements of a Playback Device. For example, if the user wants to hear Stems 2, 5, and 7 only, the server will stream a mix of those 3 stems. This would solve a limitation for any device that does not allow multiple concurrent audio playback instances.

When stems for a specific song/work are initially introduced to the server, the server may automatically process and store multiple Stem combinations (mixes) to be delivered to a user and/or playback device when requested. (e.g., drums, bass vocals but no guitar/guitar, drums, bass but no vocals/and etc.). When a user mutes an instrument, the server streams the requested mix to the user/playback device. If a user creates a combination/mix not previously processed, the server may process the requested mix on demand and may then stream the completed mix to the user. This new mix may now be available for on-demand access for subsequent user requests.

In various embodiments, on-demand delivery of Stems may utilize Predictive Buffers and Behavior Learning wherein individual stems are stored in the cloud, on a server with a processor and memory, and mixed and delivered, in real time, to a device using a buffer. The Device will request delivery of a Song from the server. Before delivery of a mix takes place, the Device must authenticate and confirm its identity with the server using an authentication process. Once authenticated, the Server will process and combine each Stem audio file via interleaving resulting in the output of one combined audio/data file. This output will then be delivered via a stream to the Device. In order to deliver various of Stem mixes correctly, the server sends instructions to the Device to wipe the currently loaded buffer of the Device and replace it with the new data. This will happen both for each mute event and each seek event.

The server may use Machine Learning algorithms to determine the Device's behavior and predict which Stems are likely to be requested based on past behavior of the User/Device. Upon each request, the Server will process both a default mix in a short buffer, as well as a "Predictive Mix" that will only be delivered if certain behavioral criteria are met.

In various embodiments, on-demand delivery of Stems may utilize a Virtual Machine (VM) setting to facilitate the streaming delivery of Stems. When a user requests a specific combination of stems (a mix), the server will create a VM session with the user, load the relevant stems to the VM's memory and will then begin to play the mix within the VM. All loaded stems will play to a certain audio channel on the virtual machine, and the channel's output will be streamed in real time to the user's Device. The user will control the virtual machine's playback via a Device, which could be a web application, smartphone application, voice assisted application, etc.

Figure 7:
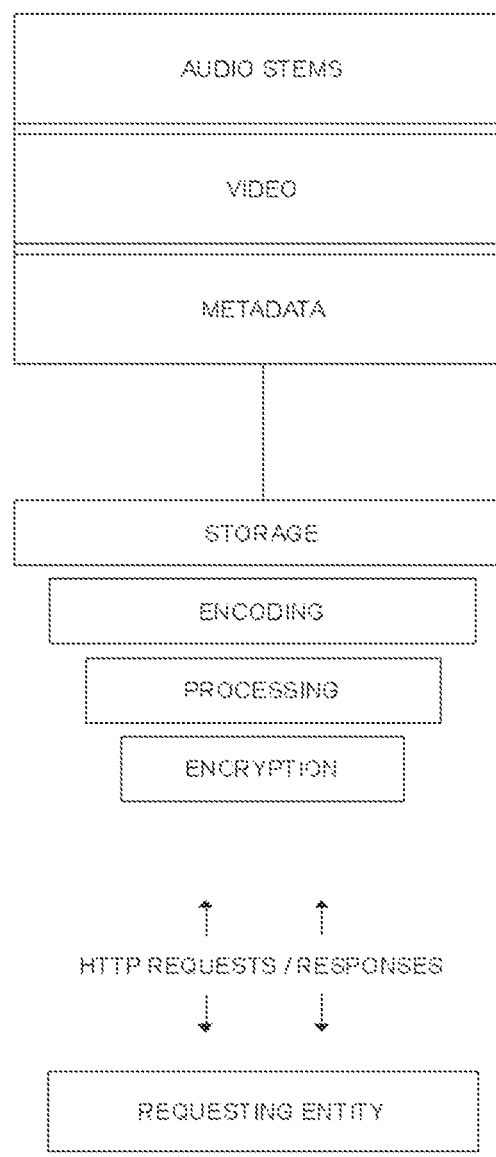
FIG. 7 shows an exemplary server-side component communicating with a requesting entity, in accordance with various embodiments.
Figure 8:
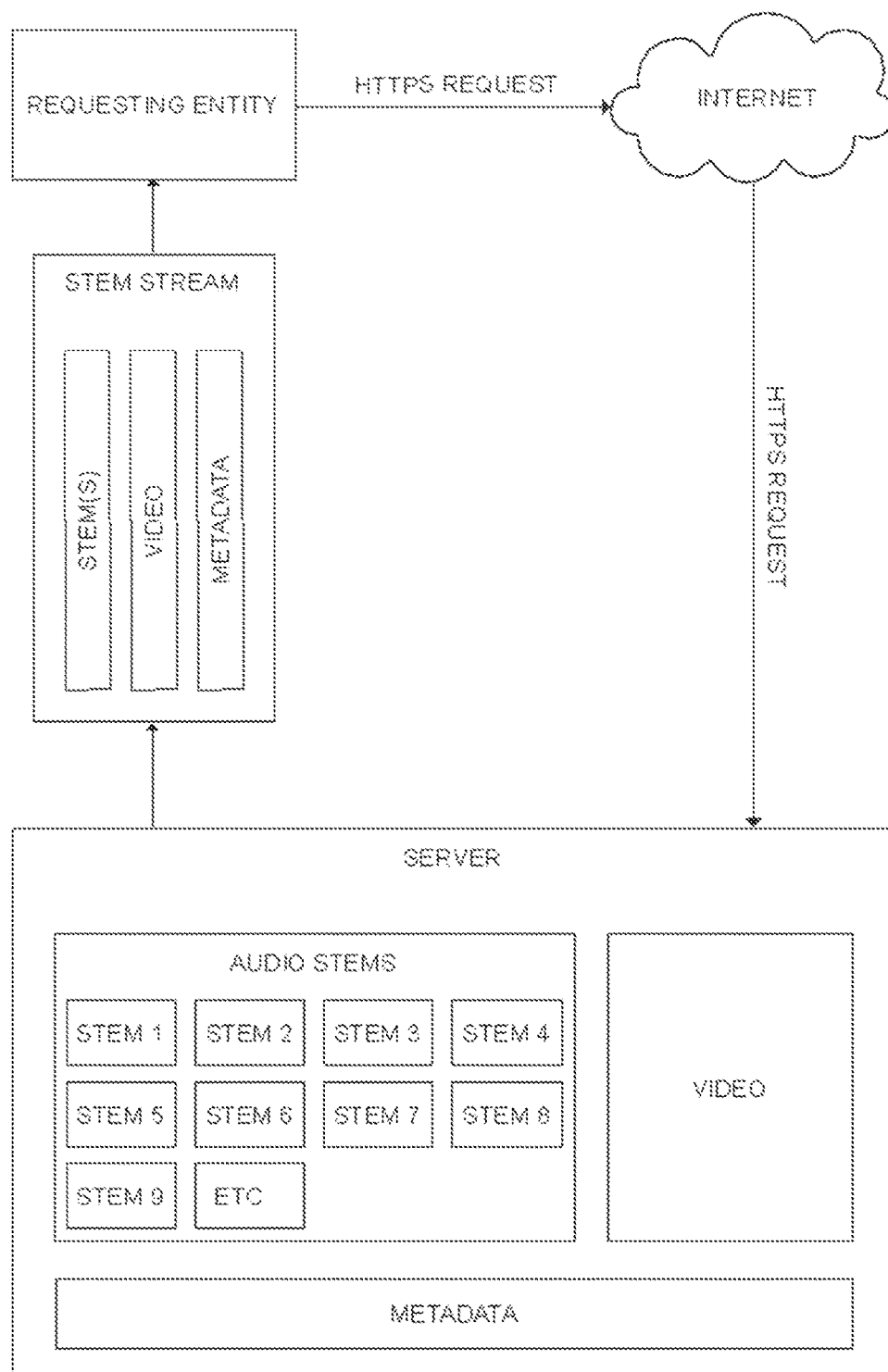
FIG. 8 shows an exemplary requesting entity sending an HTTPS request and a server responding with a stem stream, in accordance with various embodiments.

The system includes a server-side component that encodes, compiles, stores, processes, encrypts, and delivers a combination of Stems, Metadata, and/or Video Files as requested by a client service, application or device (the Requesting Entity), as set forth in FIG. 7. The Requesting Entity sends an HTTPS request using a shared set of instructions, and the server responds by delivering a Stem stream, along with related Metadata, as set forth in FIG. 8.

The request can be any combination of the Stems available for a given song or soundtrack (a Work). The stream may also include content related to the Work including, for example, lyrics, chords, musical notation, song information, artist information, video, graphics, copyright information, encryption, and/or related instructions. The Stem Delivery via streaming provides an efficient delivery solution including, for example, secure storage and distribution of copyrighted material, ability to append, change, or update contents as needed, server-side processing for resource and service-level management, compression and/or encryption.

The Requesting Entity may be one or more of the following: Playback Device (PC, iOS, Android, smart TV, TV-connected streaming device, smart radio, etc.); Client-Side Application (web service, mobile application, PC application); DSP (streaming music, streaming video, radio); Production Facility (production, post-production, editing, recording, mixing, mastering, broadcast); Record Label, music publishers, performance-rights organizations (PROs); Artist management, legal representation; Producers, DJs, or related industry professionals.

Figure 9:
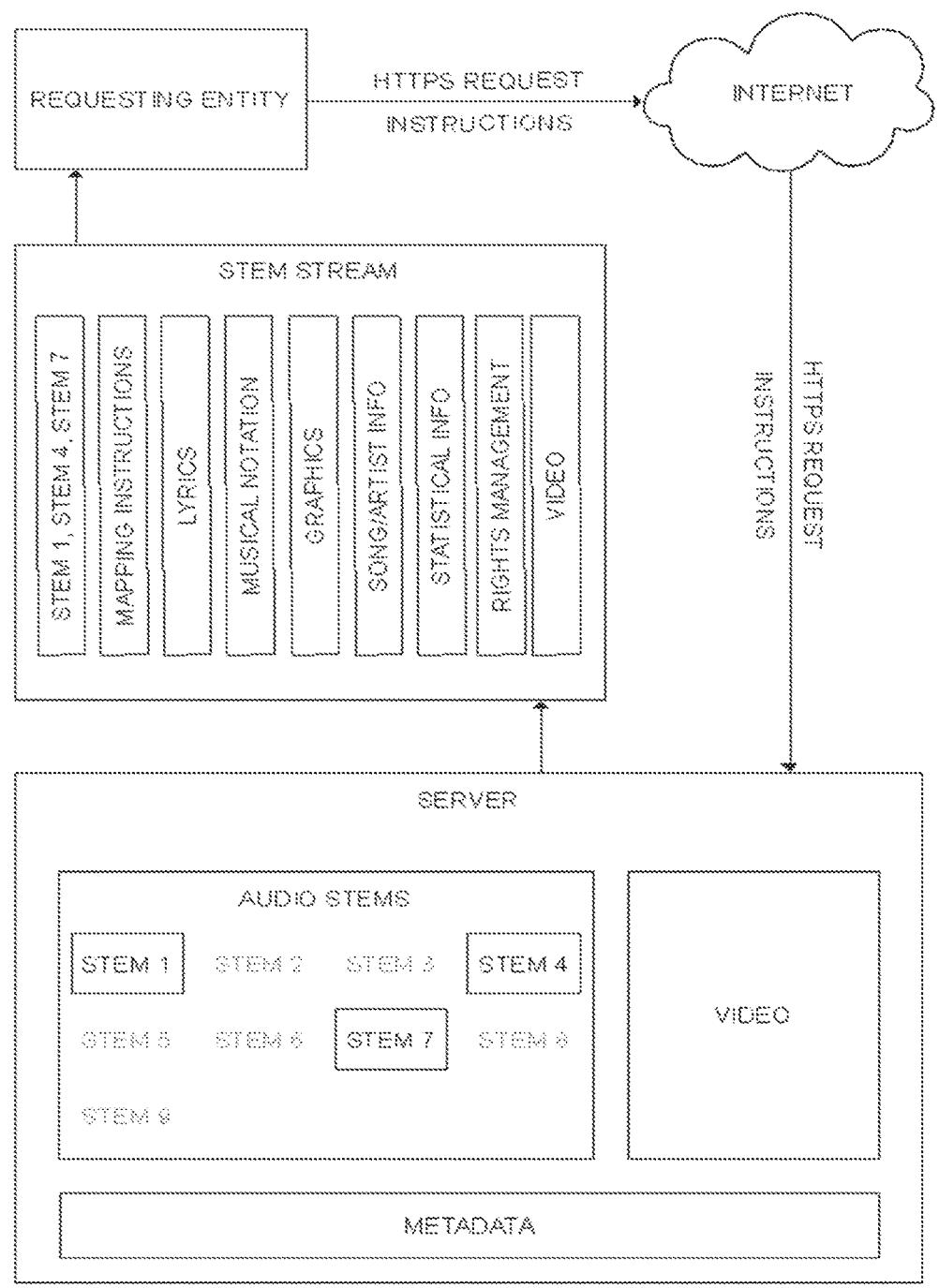
FIG. 9 shows an exemplary requesting entity sending an HTTPS request and a server responding with a stem stream containing different metadata, in accordance with various embodiments.

The Requesting Entity places an HTTPS request to an administrative server. The request may include details about the user/requester such as, for example, user id, device information, operating system details, device serial number, manufacturer, model, IP address, geo location, UUID, software version, and user authentication request. Based on the User Id and Title ID sent in the request, the server may authenticate or deny access to content and metadata. Upon successful authentication the server responds with data relating to the Title ID requested, including an array of dynamic, unique, and/or encoded URL's that correspond to different stem streams. To ensure secure transfer of stem streams, the URL's encoding allows only one authenticated user access to the stream, and only at that instance. Each URL also contains a TTL (time to live) and is set to expire after use. For additional security, the Playback Device and the User cannot access or use the URL in any other method or time, nor can the URL be traced to reveal the path where the secure content is stored. When media is initially requested, the associated metadata corresponding to that media is delivered to the playback device. The playback device may display the metadata and make it available for access. In various embodiments, the request includes an instruction set specifying which Stems are to be delivered, and in which combination. As set forth in FIG. 9, the server response contains the Stems, graphics, or video requested, plus Metadata which may include, for example, one or more of: Stem and Metadata mapping instructions; Lyrics/dialog; musical notation (chord names, chord shapes, standard notation, tablature); Work information (artist, date, album, songwriter(s), record label, studio, publisher(s), company, etc.); Work musicians/personnel information; Work description information; Work statistics; recording information (instruments, equipment, recording studio, etc.); and Work rights information.

The system is also configured to allow the requesting entity to provide control and interaction. In order to interact with Stems, multiple, successive instructions can be requested by a Requesting Entity similar to the functions and instructions set forth above.

In various embodiments, server-side processing is utilized to create user requested combinations of Stems on demand, to enable accessibility features, including solutions for the hearing impaired. An example using this method may be an audio-visual Work containing Video, Dialogue, Music, and Sound Effects, each of which are combined into individual Stem Audio Files. A user would have the option to reduce the volume of the Effects and Music Stems, thereby making the Dialogue Stem more intelligible, or to increase the volume of the Dialogue stem. The Playback Device sends the instructions to the Server, and the Server delivers the requested Stream, with each stem at the requested volume, to a Playback Device.

In various embodiments, server-side processing is utilized to create user requested combinations of Stems on demand, to enable various language selections. An example using this method may be an audio-visual Work containing Video, Dialogue, Music, and Sound Effects, each of which are combined into a Stem Audio File. Furthermore, there may be multiple Dialogue Stem Audio Files, each representing a different language. The user could play the Work on a Playback Device which by default includes the Dialogue Stem in English. The user could then initiate a request to access Spanish dialogue instead, thereby sending instructions to the Server. This would instruct the server to cease streaming the English Stem, and to begin to stream the Spanish Stem. The Playback Device sends the instructions to the Server, and the Server delivers the requested Stream, at a requested volume, to a Playback Device.

In various embodiments, the system may allow a user to upload their own stem recordings via a user login environment. These uploaded stems may then be accessed and interacted with via a playback device. This access may be for the user's own private use, or may also be made available to other users. In various embodiments, the system may request that other users enter an email address, a specific code or identifier to gain access to the uploaded stems. The uploaded stems may consist of one or more of the following types of recordings: original music, lessons, studies, etc. The stems may be uploaded by casual users, or by professionals in the field (e.g. artists, musicians, producers, engineers, agents, promoters, etc.). Uploads may be for different purposes including, for example, entertainment, resume, showcase, educational, promotional, rehearsal-use, performance-use, or simply to share one's work.

In various embodiments, the system may allow users to access a closed and/or private environment for a specific group including, for example, an organization, business, or educational institution (e.g. primary school, college or university, vocational school, conservatory, etc.). In various embodiments, the system may request that a user enter an email address associated with the organization to join the group environment, or the user might be given a specific code or identifier to enter in order to gain access. The group environment may contain content provided by or authorized by the group. The group environment may be branded or "skinned" to customize the look and feel for its users. For example, a music conservatory could have their own group environment on the platform wherein the conservatory and/or its faculty may upload recordings to be utilized by students as part of the school curriculum or course requirements. Likewise, a student may be able to submit the student's own recordings in order to fulfill the work requirements for a class. In another example, a community theater group could upload stems of background music, and the performers could utilize the stems for rehearsals and for practice to supplement or enhance an in-person rehearsal environment. In another example, a music professor at a university could upload recordings for her students that accompany and enhance the material taught in class.

The system may include one or more of the following features and functions of computer programs, computer hardware and databases. The computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPRERE® MQTM (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOME-POD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers.

The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTPS, HTTP, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improve computer performance by, for example, reducing processing times. Furthermore, the distributed computational resources improve computer performance by improving security using, for example, cryptographic protocols.

Any communication, transmission, and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUIMBLR®, REDDIT®, SNAPCHAT®, WHATSAPP®, FLICKR®, VK®, QZONE®, WECHAT, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment.

Although specific advantages have been enumerated herein, various embodiments may include some, none, or all of the enumerated advantages.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:
1. A system comprising:
a processor; and
a tangible, non-transitory memory configured to communicate with the processor,
the tangible, non-transitory memory having instructions stored thereon that, in response to execution by the processor, cause the processor to perform operations comprising:
receiving, by the processor, a stem request for encoded stems, wherein the stem request includes identifiers, wherein each of the encoded stems is associated with a respective one of the identifiers;
accessing, by the processor, the encoded stems via a remote server, in response to the stem request and based on the identifiers; and streaming, by the processor, the encoded stems in real-time to a user,
wherein the user interacts in real-time during the streaming with one or more of the encoded stems based on one or more of the respective identifiers, via software controls on a playback device, and
wherein in response to a decode request by the user, the software controls decode the encoded stems during the streaming.

2. The system of claim 1, wherein the user interaction includes controlling attributes of the stems.

3. The system of claim 1, wherein the user interaction includes controlling attributes of the stems, wherein the attributes include at least one of mute, solo, mix, export, combine, isolate, slow down, speed up, click track, view, hide, move or volume adjustment.

4. The system of claim 1, further comprising receiving, by the processor, an HTTPS request from the playback device.

5. The system of claim 1, further comprising receiving, by the processor, an HTTPS request from the playback device, wherein the request includes at least one of user ID, title ID, device information, operating system details, device serial number, manufacturer, model, IP address, geo location, UUID, software version, or user authentication request.

6. The system of claim 1, further comprising restricting, by the processor, access to the encoded stems at a certain time to only the user, by using encoded URLs that comprise the encoded stems.

7. The system of claim 1, further comprising providing, by the processor, URLs including the encoded stems, wherein each URL at least one of is unique to the user ID, contains a TTL (time to live) or a setting to expire after use.

8. The system of claim 1, further comprising providing, by the processor, metadata associated with the encoded stems to the playback device.

9. The system of claim 1, further comprising providing, by the processor, metadata associated with the encoded stems to the playback device, wherein the metadata includes at least one of multiple streams of audio Stems, mapping for audio Stems, song lyrics, song musical notation, song related videos, images and graphics, song information, musician information, personnel information, song description information, song statistics, recording information, or rights information.

10. The system of claim 1, further comprising creating, by the processor, additional encoded stems that include recordings created by the user alongside the encoded stems.

11. The system of claim 1, further comprising communicating, by the processor, with an external hardware device that utilizes the software controls of the playback device.

12. The system of claim 1, further comprising loading, by the processor, the encoded stems into a memory of the playback device.

13. The system of claim 1, wherein the playback device begins playback at a synchronized starting point.

14. The system of claim 1, further comprising loading, by the processor, two sets of encoded stems into memory simultaneously to implement a buffering solution.

15. The system of claim 1, further comprising receiving, by the processor, user input to control the encoded stems that trigger an API call to the playback device.

16. The system of claim 1, further comprising providing, by the processor, a song progress representation.

17. The system of claim 1, further comprising receiving, by the processor, an instruction for at least one of removing, isolating, mute or solo an instrument.

18. The system of claim 1, further comprising measuring, by the processor, a decibel level of the encoded stem.

19. An article of manufacture including a non-transitory, tangible computer readable storage medium having instructions stored thereon that, in response to execution by a computer-based system, cause the computer-based system to perform operations comprising:
receiving, by the processor, a stem request for encoded stems, wherein the stem request includes identifiers, wherein each of the encoded stems is associated with a respective one of the identifiers;
accessing, by the processor, the encoded stems via a remote server, in response to the stem request and based on the identifiers; and
streaming, by the processor, the encoded stems in real-time to a user,
wherein the user interacts in real-time during the streaming with one or more of the encoded stems based on one or more of the respective identifiers, via software controls on a playback device, and
wherein in response to a decode request by the user, the software controls decode the encoded stems during the streaming.

20. A method comprising:
receiving, by a processor, a stem request for encoded stems, wherein the stem request includes identifiers, wherein each of the encoded stems is associated with a respective one of the identifiers;
accessing, by the processor, the encoded stems via a remote server, in response to the stem request and based on the identifiers; and
streaming, by the processor, the encoded stems in real-time to a user,
wherein the user interacts in real-time during the streaming with one or more of the encoded stems based on one or more of the respective identifiers, via software controls on a playback device, and
wherein in response to a decode request by the user, the software controls decode the encoded stems during the streaming.

* * * * *